(No Model.)
J. FISCHER.
CAR BRAKE.
No. 459,836.  Patented Sept. 22, 1891.
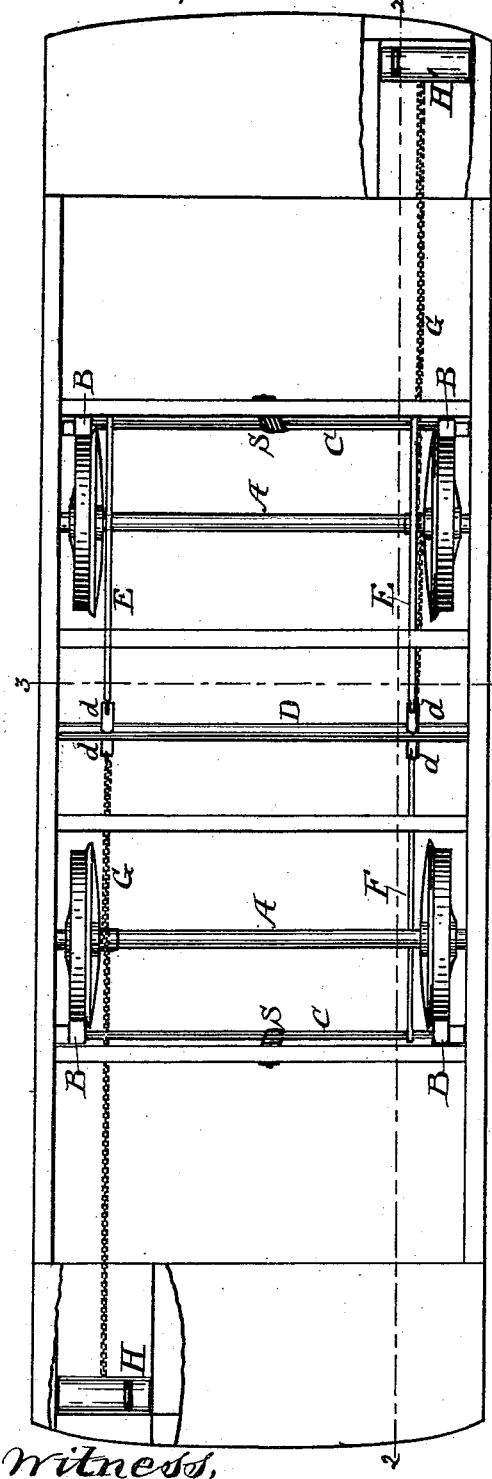
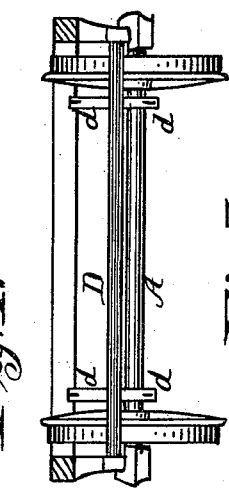
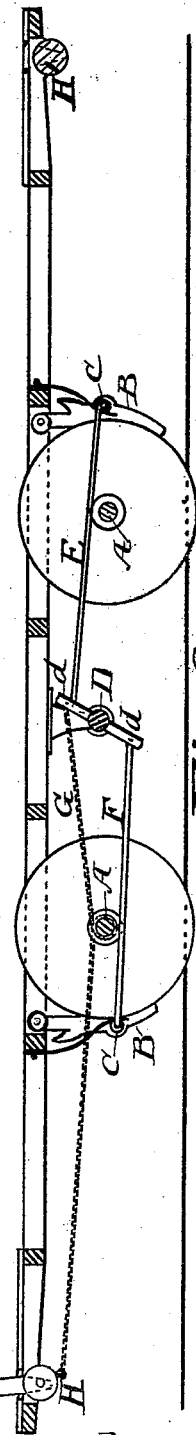
Witness,
Phelps Sanford
E. A. Tibbitts
Inventor,
Joseph Fischer,
By Geo. W. Tibbitts, atty.

UNITED STATES PATENT OFFICE.

JOSEPH FISCHER, OF CLEVELAND, OHIO.

CAR-BRAKE.

SPECIFICATION forming part of Letters Patent No. 459,836, dated September 22, 1891.

Application filed June 25, 1891. Serial No. 397,543. (No model.)

*To all whom it may concern:*

Be it known that I, JOSEPH FISCHER, a citizen of the United States, residing at Cleveland, in the county of Cuyahoga and State of Ohio, have invented certain new and useful Improvements in Car-Brakes, of which the following is a specification.

This invention relates to brakes for cars; and it consists of the novel construction and combination, as hereinafter described, and pointed out in the claims.

In the accompanying drawings, Figure 1 is a top or plan view of a car-truck having my improved brake mechanism attached. Fig. 2 is a longitudinal section of the same on line 2 2 on Fig. 1. Fig. 3 is a cross-section on line 3 3 on Fig. 1.

A A represent the car-axles, and B B are the brake-shoes. Each pair of shoes I connect together by a rod C, the shoes being suspended from the truck-frame.

D is a rock-shaft suitably journaled to the truck-frame midway between the axles A A.

$d\ d$ are cross arms or levers attached to the rock-shaft.

E E are rods connecting the upper arms $d$ with the brake-rods at one end of the truck, and F F are similar rods connecting the lower arms $d$ with the brake-rod at the opposite end of the truck.

G G' are chains or cords, one connecting the upper arm $d$ and passing with one or more turns around the axle A and extending to a roller H journaled under the platform, the roller having a socket for the reception of a removable hand-lever I, the other chain G' connecting the lower arm $d$ at the other side of the truck and passing with one or more turns around the other axle and extending to and connected with a roller H' at the other end of the car. A split or open metal sleeve may be placed on the axle where the chain winds around it for the purpose of increasing friction and protecting the axle.

S S are springs attached to the cross-beams of the truck and their lower ends bearing against the brake-rods for the purpose of holding the brake-shoes off from the wheels.

The working of this mechanism is as follows: The pulling on the chain causes it to bind upon the axle, the friction of which, acting with the momentum of the car, makes a strong pull upon the levers $d\ d$, and thereby sets the brakes very firmly against the wheels. It will be seen that this mechanism may be operated from either end of the car with the same result.

Having described my invention, what I claim is—

1. In a car-brake, the combination, with the truck, of a rock-shaft journaled midway between the car-axles and having cross arms or levers, connecting rods or links attached to said arms or levers and with the brake rods or shoes, chains or cords attached to said arms or levers and passed or wound around the car-axles and extending to the ends of the car, and means for pulling said chains, whereby the friction of the chains around the axles is adapted for setting the brakes, substantially as described.

2. In a car-brake, the combination, with the truck, of a rock-shaft journaled between the car-axles and provided with the cross arms or levers, connecting rods or links connecting said arms or levers with the brake rods or shoes, chains or cords attached to said arms or levers and wound around the axles and extending to the ends of the platforms, connected to rollers journaled in the platforms, and removable hand-levers attached to said rollers, whereby the chains or cords are adapted to operate the rock-shaft for setting the brakes, substantially as and for the purpose described.

JOSEPH FISCHER.

Witnesses:
GEO. W. TIBBITTS,
M. G. NORTON.